(12) United States Patent
Hönig et al.

(10) Patent No.: US 6,986,414 B2
(45) Date of Patent: Jan. 17, 2006

(54) HYDRAULIC SHOCK ABSORBER

(75) Inventors: Michael Hönig, Ennepetal (DE);
Günter Poetsch, Sersheim (DE);
Hendrik Kloss, Hamburg (DE); Stefan Mages, Hürth (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/834,642

(22) Filed: Apr. 29, 2004

(65) Prior Publication Data
US 2004/0222057 A1 Nov. 11, 2004

(30) Foreign Application Priority Data
Apr. 30, 2003 (DE) ................................ 103 19 390

(51) Int. Cl.
*F16F 9/56* (2006.01)
(52) U.S. Cl. ................. 188/282.9; 188/319.1; 188/319.2
(58) Field of Classification Search ............. 188/282.1, 188/282.2, 282.4, 282.8, 282.9, 319.1, 319.2
See application file for complete search history.

(56) References Cited

U.S. PATENT DOCUMENTS

| | | | | |
|---|---|---|---|---|
| 4,671,392 A | * | 6/1987 | Wossner | 188/266.5 |
| 4,706,787 A | * | 11/1987 | Wossner | 188/282.4 |
| 5,094,321 A | * | 3/1992 | Neumann | 188/282.3 |
| 5,168,965 A | * | 12/1992 | Huang | 188/282.2 |
| 6,474,454 B2 | * | 11/2002 | Matsumoto et al. | 188/282.6 |

FOREIGN PATENT DOCUMENTS

DE   3608738 A1 * 9/1987
DE   4025880 A1 * 2/1992

* cited by examiner

*Primary Examiner*—Thomas Williams
(74) *Attorney, Agent, or Firm*—Max Fogiel

(57) ABSTRACT

A hydraulic dashpot with a cylinder (1), a piston (4), and a bypass. The cylinder is charged with fluid. The piston partitions the cylinder into two compartments (7 & 8), travels back and forth therein on the end of a piston rod (2), and is provided with breaches and valves. The open cross-section of the bypass can be expanded and contracted and fixed in accordance with the direction the piston is traveling in, depending on whether the dashpot is in the compression or in the suction phase. The bypass is provided with an axially displaceable control component. One end of the control component comes to rest against a valve, its displacement being limited by stops. The bypass is accommodated in an axial bore through the piston rod. The bypass operates in conjunction with various outlets that open into the compartments. The control component is provided with at least one lateral flange and travels back and forth in at least one tube. The object is a smooth performance curve and low wear. The control component is accordingly in several parts, comprising at least two bypass control caps that axially travel up to stationary stops. The caps, in conjunction with axially variable components (18 & 21) that dictate the size of the open cross-section in both the compression and the suction phase, create a port.

6 Claims, 2 Drawing Sheets

HYDRAULIC SHOCK ABSORBER

BACKGROUND OF THE INVENTION

Hydraulic dashpots are employed to absorb the shock that accompanies the motion of spring-articulated wheel suspensions, preferably in motor vehicles.

The shock is absorbed by forcing fluid out of one compartment and into another in a cylinder through preferably spring-loaded ports in a piston.

A known method of ensuring well defined shock absorption at low piston speeds is to provide bypasses hydraulically paralleling the ports, the two compartments communicating through the bypasses. Providing the bypasses with variable open cross-sections is also known.

German 10 138 487 C1 discloses a dashpot of this genus. It includes a bypass accommodated in a bore through the center of the piston rod. The bypass operates in conjunction with lateral outlets leading out of the piston rod. The bypass is adjusted to the various motions of a dashpot piston in the device's cylinder (1) (compression phase and suction phase), by a control rod fitted with lateral flanges and traveling back and forth inside at least one tube. The tubes can be relatively adjusted axially and are provided with stops for the control rod flange.

There is a drawback to this system. Since the direction traveled by the control rod constantly changes in accordance with the direction traveled by the dashpot, and since the flanges are constantly hitting the stops, the control rod's mass is extremely heavy, and must be repeatedly accelerated. The control rate is accordingly limited in height, resulting in the creation of powerful forces and hence serious wear.

SUMMARY OF THE INVENTION

The object of the present invention is accordingly an improved bypass that, while simple in structure, will be less subject to the aforesaid drawback.

The dashpot in accordance with the present invention has several advantages that derive from the bypass being controlled by a component of much lighter mass. In one version caps are maintained axially separated by a spring, the bypass-control component will not need to be constantly accelerated in order to perform its tasks. Of further advantage here is that the bypass cannot generate perceptible impacts. Furthermore, the bypass-control component is not in the form of a control rod that must be shifted into an operating position before closing. The advantage in this case is that it is unnecessary to establish pressure before shifting the cap into its operating position. This feature is particularly beneficial for the bypass's performance curve.

BRIEF DESCRIPTION OF THE DRAWINGS

The present invention will now be specified with reference to the accompanying drawing, wherein.

Figure 1:
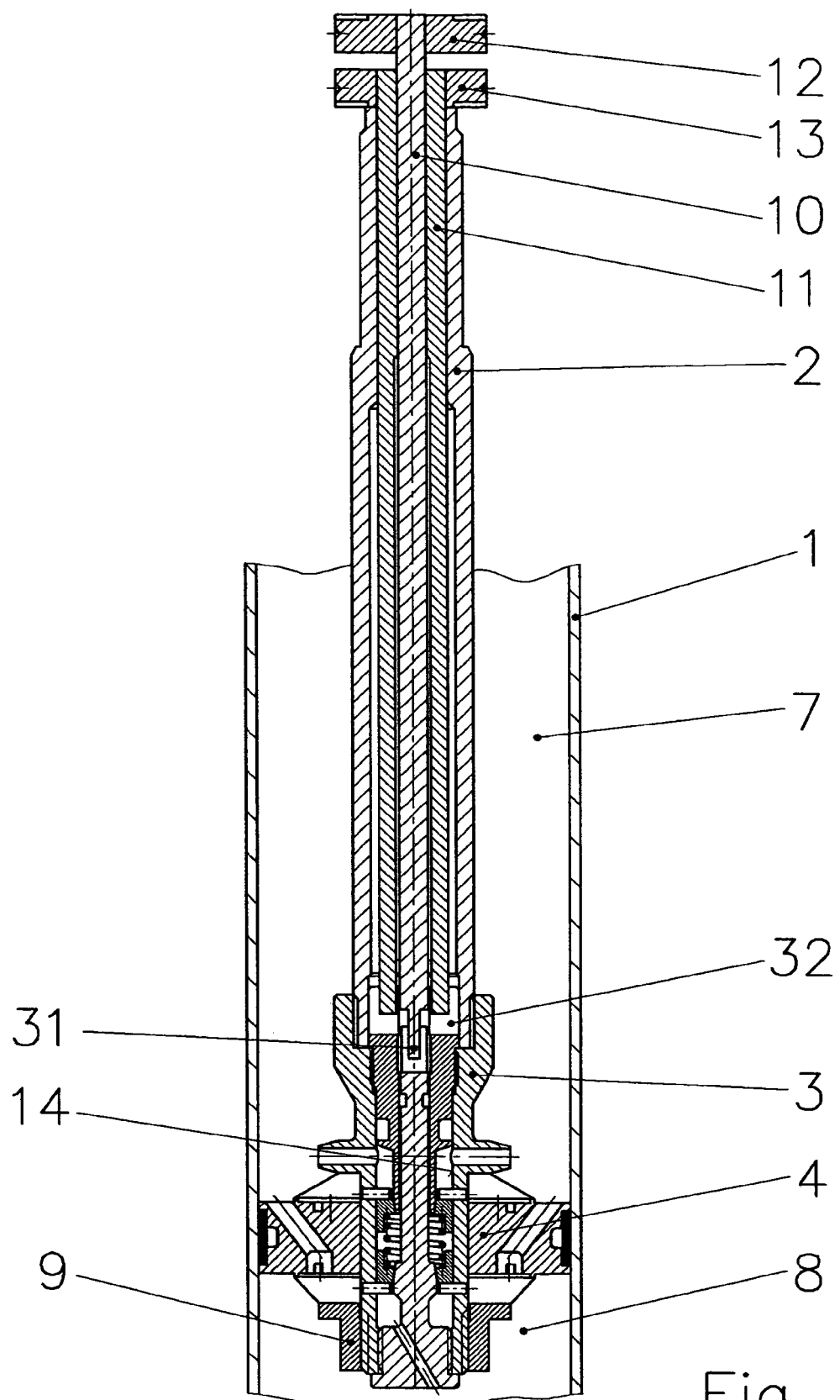
FIG. 1 is a section through the dashpot's piston and FIG. 2 is a larger-scale rendering of a portion thereof.

The dashpot is provided with a fluid-charged cylinder 1. A piston rod 2 travels into and out of cylinder 1. A piston 4 is fastened to one end of piston rod 2 by way of an extension 3. Piston 4 partitions cylinder 1 into two compartments 7 and 8. The piston is provided with breaches 5 and with flow-attenuating valves.

DESCRIPTION OF THE PREFERRED EMBODIMENTS

With piston rod 2 in the suction phase, the fluid flows out of upper compartment 7 and into lower compartment 8 through piston 4. In this phase, the fluid is decelerated by breaches 5 and by the valves. In the compression phase, the fluid flows through piston 4 in the opposite direction, out of lower compartment 8 and into upper compartment 7.

Piston 4 is fastened to extension 3 by fasteners, e.g. nut 9.

To facilitate installing the bypass, piston rod 2 is provided with an axial bore, extending in the illustrated example through the center. Extension 3 is also provided with such a bore. The adjustable bypass itself is accommodated in the extension, the bore through the center of piston rod 2 accommodating associated controls, specifically a bypass-control rod 10 and, enclosing it, a bypass-control tube 11. Outside piston rod 2, bypass-control rod 10 and bypass-control tube 11 are provided with bypass-adjustment wheels 12 and 13. The open cross-section of the bypass can be varied by rotating bypass-control rod 10 or bypass-control tube 11 by way of bypass-adjustment wheels 12 and 13.

Figure 2:
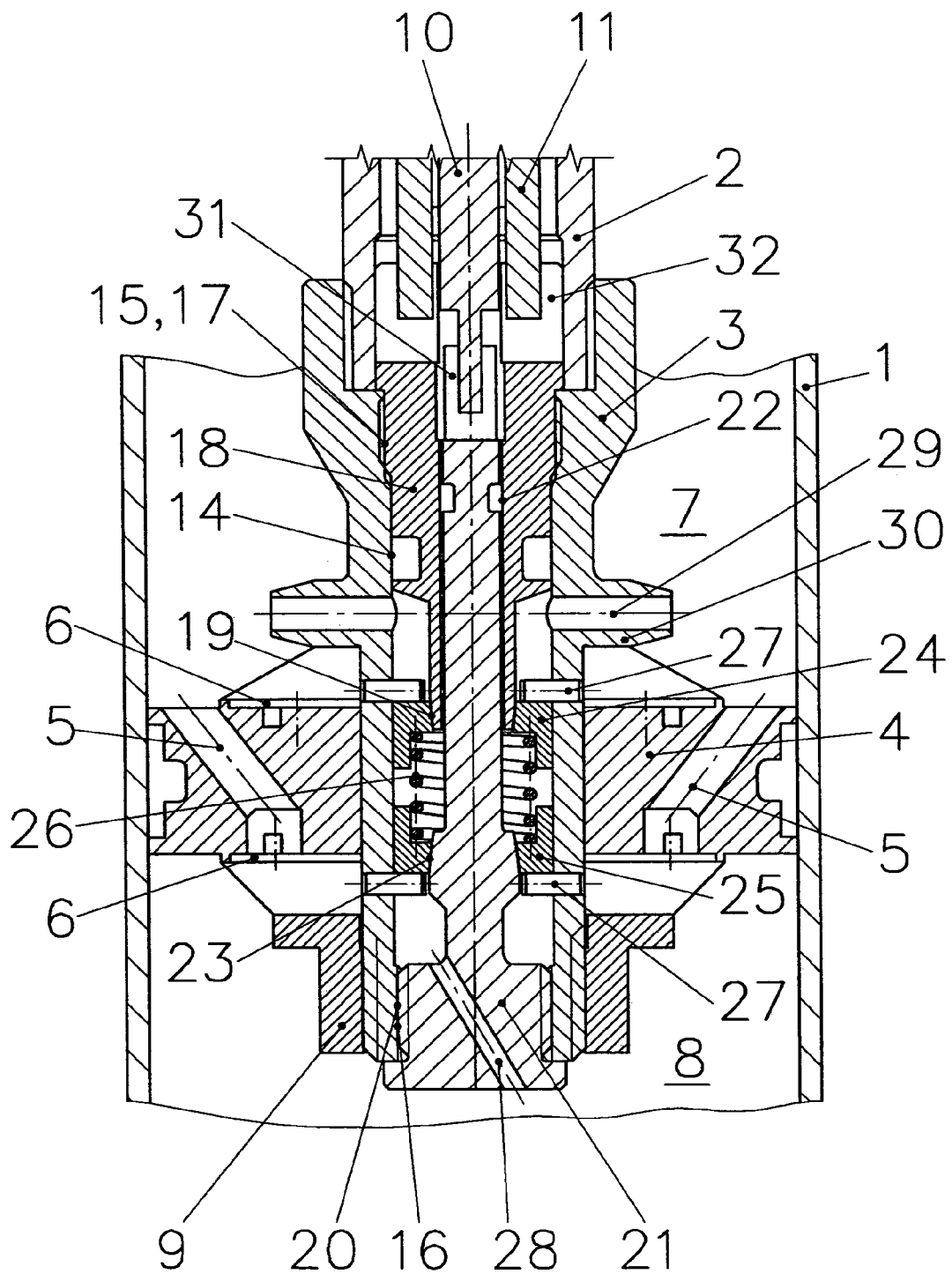

The bypass itself, accommodated as hereintofore specified inside piston-rod extension 3, is depicted larger-scale in FIG. 2. Extension 3 is screwed over the end of piston rod 2. It is provided with a central bore 14 that accommodates the aforesaid controls. Each end of bore 14 is provided with inside threading 15 and 16. Screwed into the inside threading 15 represented at the top of FIG. 2 is a bypass cross-section varying component 18 with a matching outside thread. Bypass-control component 18 is provided at its lower end with a conical valve 19. A variable bypass cross-section varying component 21 is mounted along the bottom of the figure by way of matching outside threading 20. Variable bypass cross-section varying component 21 is in the form of a pin and extends through bypass-control component 18 by way of a central bore 22. Variable bypass cross-section varying component 21 is also provided with a conical valve 23.

Sliding back and forth axially between conical valves 19 and 23 inside the bore 14 through the center of extension 3 are bypass control caps 24 and 25, rings with an L-shaped wall in the present embodiment. A compressed helical spring 26 is accommodated between bypass-control caps 24 and 25, maintaining the caps separated subject to a prescribed force. The axial position of bypass control caps 24 and 25 is dictated by cylindrical pins 27 accommodated in extension 3.

The fluid flows through the bypass by way of a breach 28 in the wall of variable bypass cross-section varying component 21 and hence into the control component. Breach 28 provides communication with lower compartment 8. The bypass communicates with upper compartment 7 through breaches 29 in piston-rod extension 3. The breaches 29 in the illustrated embodiment are penetrated by liners 30.

Rotary connections 31 and 32 in the form of slots and blades connect bypass-control component 18 to bypass-control tube 11 and variable bypass cross-section varying component 21 to bypass control rod 10. When rod 10 or tube 11 is rotated, accordingly, the particular component 18 or 21 attached thereto will also rotate and will screw into or out of its associated inside threading 15 or 16. The resulting travel will in turn axially displace the associated conical valve 19 or 23 relative to bypass control cap 24 or 25. Hence, as the cap comes to rest against a pin 27, the annular gap that constitutes the bypass can be widened or narrowed to conform to the dashpot's immediate, compression or suction, phase.

As piston rod 2, with piston 4 mounted on it, travels into cylinder 1, accordingly, the pressure in lower compartment 8 will increase in relation to the pressure in upper compartment 7. Lower bypass-control cap 25 will lift off of lower cylindrical pins 27 against the force of spring 26. The pressures will be equilibrated by the fluid as it flows through the gap between upper bypass control cap 24 and conical valve 19 in bypass-control component 18. Fluid flowing through the gap will arrive in upper compartment 7 by way of breaches 29.

As piston rod 2, with piston 4 mounted on it, travels out of cylinder 1, however, the fluid can flow in the opposite direction. The elevated pressure in upper compartment 7 will lift upper bypass-control cap 24 off of cylindrical pins 27, allowing the fluid to flow through the gap between lower bypass-control cap 25 and the conical valve 23 in variable bypass cross-section varying component 21.

LIST OF PARTS 1. cylinder
2. piston rod
3. piston-rod extension
4. piston
5. breaches
6. spring
7. upper cylinder compartment
8. lower cylinder compartment
9. nut
10. bypass-control rod
11. bypass-control tube
12. wheel
13. wheel
14. bore
15. inside threading
16. inside threading
17. outside threading
18. bypass cross-section varying component
19. conical valve
20. outside threading
21. bypass cross-section varying component
22. central bore
23. conical valve
24. upper bypass-control gasket
25. lower bypass-control gasket
26. spring
27. cylindrical pins
28. breach
29. breaches
30. liners
31. rotary connection
32. rotary connection

What is claimed is:

1. A hydraulic dashpot comprising: a cylinder with fluid therein; a single piston and a bypass, said piston dividing said cylinder into two chambers; a piston rod having an end connected to said piston said piston traveling back and forth in said cylinder; said piston having ducts and valves; said bypass having an open cross-section expandable and contractable and fixed in the traveling direction of said piston depending on whether the dashpot is in a compression phase or in a suction phase, the bypass cross-section for the flow in the suction direction of the piston rod and the cross-section of the bypass in the compression direction being fixedly settable independent of each other through bypass-adjustment means; said bypass having an axially displaceable control component with one end resting against a valve; stops for limiting displacements of said control component; said piston rod having an axial bore holding said bypass, said bypass operating in conjunction with outlets opening into said chambers; said control component having at least one lateral flange traveling back and forth in at least one tube; said control component comprising a plurality of parts with at least two bypass control caps axially traveling to stationary stops; axially variable components operating in conjunction with said caps to form a port determining the size of the cross-section opening in both the compression phase and the suction phase; and spring means for holding apart axially said bypass-control caps.

2. The hydraulic dashpot as defined in claim 1, including an extension on said piston rod for holding said bypass.

3. The hydraulic dashpot as defined in claim 2, wherein said piston is mounted around said extension on said piston rod.

4. The hydraulic dashpot as defined in claim 1, wherein one of said chambers is a lower cylinder chamber, one of said components being a lower bypass cross-section varying component, and terminal outlet means communicating hydraulically with said lower cylinder chamber through said lower bypass cross-section varying component.

5. A hydraulic dashpot comprising: a cylinder with fluid therein; a single piston and a bypass, said piston dividing said cylinder into two chambers; a piston rod having an end connected to said piston said piston traveling back and forth in said cylinder; said piston having ducts and valves; said bypass having an open cross-section expandable and contractable and fixed in the traveling direction of said piston depending on whether the dashpot is in a compression phase or in a suction phase, said bypass having an axially displaceable control component with one end resting against a valve; stops for limiting displacements of said control component; said piston rod having an axial bore holding said bypass, said bypass operating in conjunction with outlets opening into said chambers; said control component having at least one lateral flange traveling back and forth in at least one tube; said control component comprising a plurality of parts with at least two bypass control caps axially traveling to stationary stops; axially variable components operating in conjunction with said caps to form a port determining the size of the cross-section opening in both the compression phase and the suction phase; an extension on said piston rod having inside threading, said bypass cross-section varying components have outside threading matching said inside threading.

6. The hydraulic dashpot as defined in claim 5, including a positioning rod and a positioning tube for rotating said axially variable components and mating said outside threading with said inside threading to axially displace conical valves with respect to said bypass control caps so that said port comprises an annular gap as bypass adjustable for the compression and suction phases of the dashpot; and bypass adjustment wheels for positioning independently of each other said positioning rod and said positioning tube.

* * * * *